(12) United States Patent
Hsu

(10) Patent No.: US 8,362,673 B2
(45) Date of Patent: Jan. 29, 2013

(54) MICRO-IMAGE ACQUISITION AND TRANSMISSION SYSTEM

(75) Inventor: Ying Hsu, San Clemente, CA (US)

(73) Assignee: ISC8 Inc., Costa Mesa, CA (US)

(*) Notice: Subject to any disclaimer, the term of this patent is extended or adjusted under 35 U.S.C. 154(b) by 240 days.

(21) Appl. No.: 12/798,444

(22) Filed: Apr. 1, 2010

(65) Prior Publication Data
US 2010/0253179 A1  Oct. 7, 2010

Related U.S. Application Data

(60) Provisional application No. 61/212,054, filed on Apr. 6, 2009.

(51) Int. Cl.
*H02N 11/00* (2006.01)
(52) U.S. Cl. .............. 310/300; 310/12.03; 310/248; 310/251; 310/309; 359/221.2
(58) Field of Classification Search .............. 310/12.03, 310/251, 300, 309, 248, 250; 359/221.2; H02N 11/00
See application file for complete search history.

(56) References Cited

U.S. PATENT DOCUMENTS

| | | | | | |
|---|---|---|---|---|---|
| 4,358,699 | A | * | 11/1982 | Wilsdorf | 310/251 |
| 4,361,775 | A | * | 11/1982 | Diepers et al. | 310/248 |
| 4,415,635 | A | * | 11/1983 | Wilsdorf et al. | 428/611 |
| 5,832,346 | A | * | 11/1998 | Lewis | 399/168 |
| 6,071,125 | A | * | 6/2000 | Shiozawa | 439/26 |
| 6,628,036 | B1 | * | 9/2003 | Lynch et al. | 310/242 |
| 7,287,985 | B2 | * | 10/2007 | Butler | 439/13 |
| 7,622,844 | B1 | * | 11/2009 | Kuhlmann-Wilsdorf | 310/251 |
| 2004/0072994 | A1 | * | 4/2004 | Herr et al. | 530/350 |
| 2007/0159025 | A1 | * | 7/2007 | Mushika | 310/309 |
| 2007/0195408 | A1 | * | 8/2007 | Divelbiss et al. | 359/462 |
| 2008/0174855 | A1 | * | 7/2008 | Maeda et al. | 359/318 |
| 2008/0285112 | A1 | * | 11/2008 | Ishii et al. | 359/290 |
| 2009/0257110 | A1 | * | 10/2009 | Ichikawa et al. | 359/292 |
| 2010/0253179 | A1 | * | 10/2010 | Hsu | 310/300 |

* cited by examiner

*Primary Examiner* — John K Kim
(74) *Attorney, Agent, or Firm* — W. Eric Boyd, Esq.

(57) ABSTRACT

A micro-image acquisition and transmission system is provided. In a preferred embodiment, the system is comprised of an image acquisition chip comprising an electronic imager, control electronics and a micro powered rotary stage comprising a transceiver array that acts as a hub to optically link a group of distributed image acquisition chips. A preferred embodiment is further comprised of a transceiver array chip comprising one or more micro-powered rotary stages having a transceiver array assembly disposed thereon. The micro-powered rotary stage is supported by a micro-brush bearing.

9 Claims, 8 Drawing Sheets

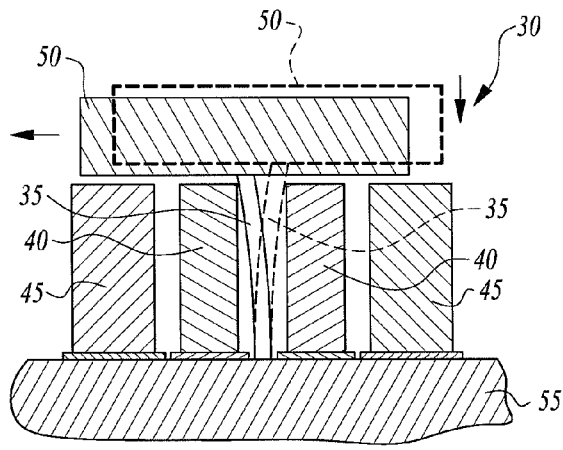
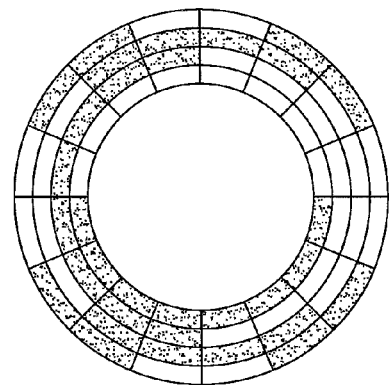
Fig. 3     Fig. 4
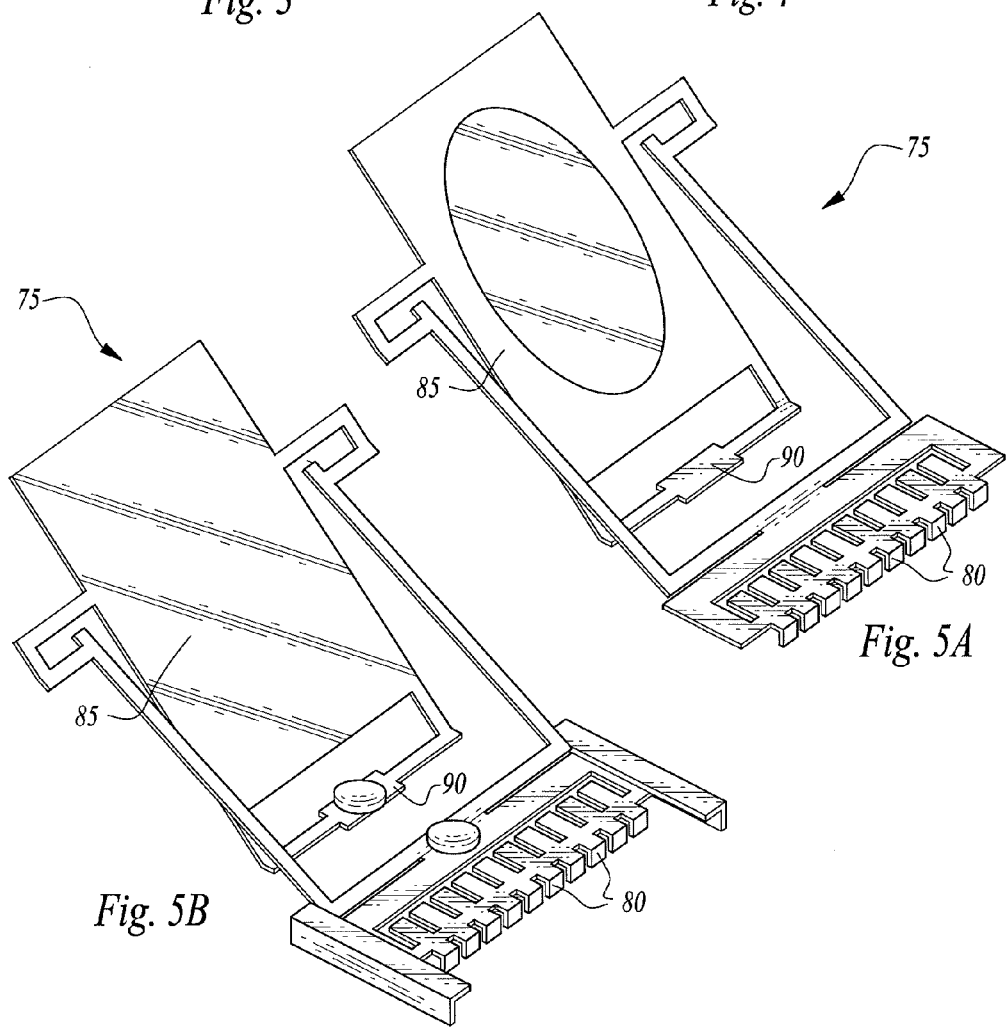
Fig. 5A
Fig. 5B

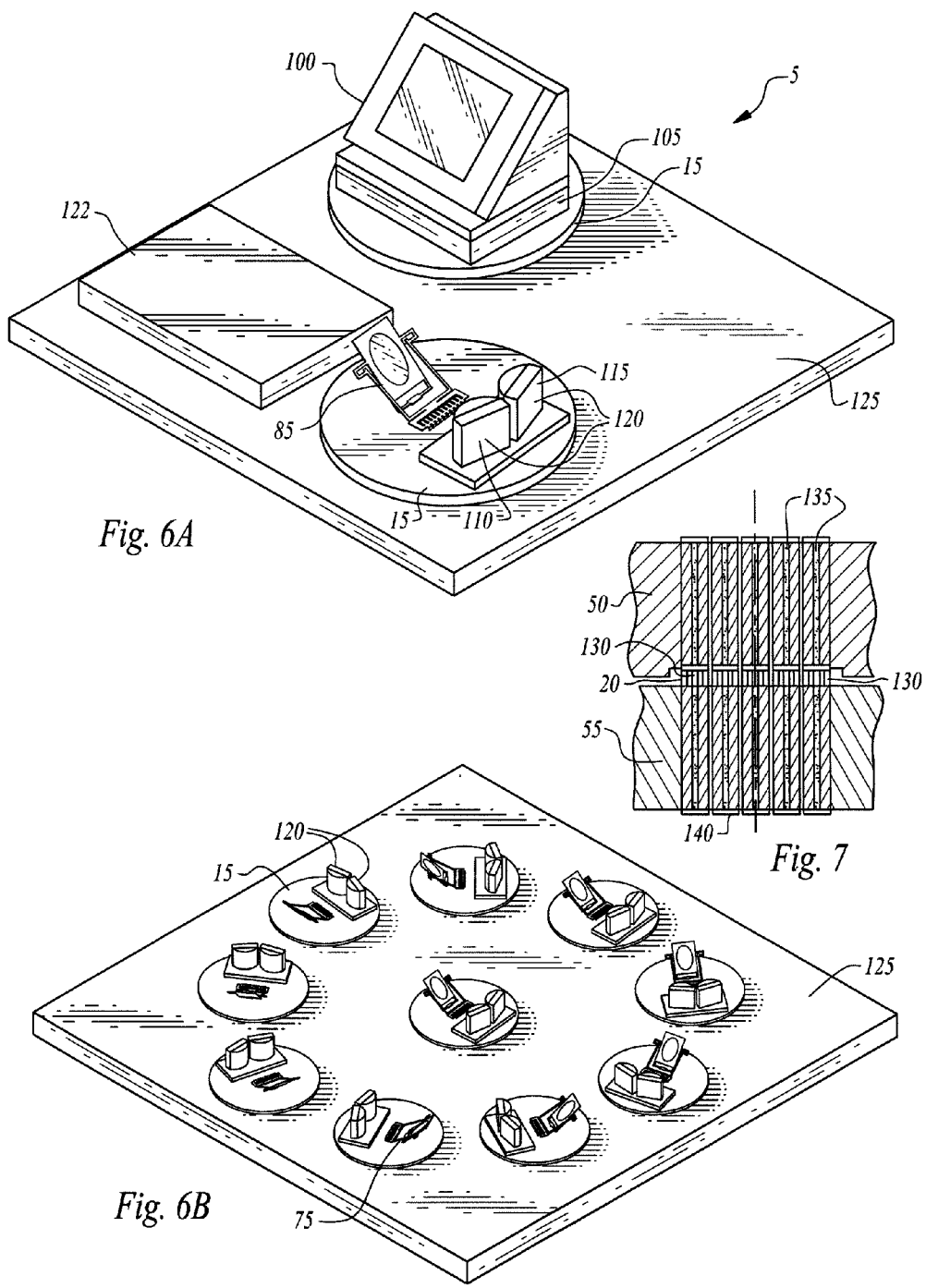

MICRO-IMAGE ACQUISITION AND TRANSMISSION SYSTEM

CROSS-REFERENCE TO RELATED APPLICATIONS

This application claims the benefit of U.S. Provisional Patent Application No. 61/212,054, filed on Apr. 6, 2009, entitled "Micro-Image Acquisition and Transmission System: pursuant to 35 USC 119, which application is incorporated fully herein by reference.

STATEMENT REGARDING FEDERALLY SPONSORED RESEARCH AND DEVELOPMENT

N/A

DESCRIPTION

1. Field of the Invention

The invention relates generally to the field of micro-electro-mechanical systems or MEMS. More specifically, the invention relates to a MEMS data transmission and acquisition system comprising a high-speed data interface and a silicon motor micro-brush element for the accurate rotational drive and positioning of one or more micro-powered rotary stages.

2. Background of the Invention

There exists a need for low power, lightweight, micro-scale optical surveillance and communication system for the acquisition and transmission of data such as video images through air space for applications such as unmanned aerial systems used for reconnaissance, targeting and surveillance.

The micro-image acquisition and transmission system of the disclosed invention addresses this need and may generally be envisioned as a network of sensors and data transmitters enabled by the disclosed micro-system generally comprising 1) one or more image acquisition chips which serve as the sensors for gathering and transmitting VGA-quality video images and 2) one or more transceiver array chips which serve as a data collection and relay "center" that optically links together a group of sensors.

The invention may consist of networks of data collection centers with each transceiver array chip linked to many imaging sensors.

The invention provides a new and greatly enhanced tactical surveillance capability in a variety of applications.

In one aspect of the invention, micro-brush bearing is provided comprising at least one electrically conductive column comprising a semiconductor material The electrically conductive column may be comprised of silicon and be substantially circular, cylindrical and/or tapered along its length.

In yet another aspect of the invention a micro-powered rotary stage is provided comprising a micro-brush bearing comprising at least one electrically conductive column comprising a semiconductor material, at least one capacitive feed-through, a micro-friction drive and a plurality of cantilever teeth. The micro-powered rotary stage may further comprise at least one electrostatic balancer or comprise a rotary encoder and an encoder reader.

In yet another aspect of the invention a micro-powered rotary stage is provided comprising a transceiver array chip comprising a micro-steerable tilt mirror assembly comprising a scratch drive and further comprise an image acquisition chip.

SUMMARY OF THE INVENTION

A micro-image acquisition and transmission system is provided. In a preferred embodiment, the system is comprised of one or more image acquisition chips comprising an electronic imager, control electronics and a micro-powered rotary stage comprising a transceiver array that acts as a hub to optically link a group of distributed image acquisition chips.

The preferred embodiment is further comprised of one or more transceiver array chips comprising one or more micro-powered rotary stages having a transceiver array assembly disposed thereon.

The micro-powered rotary stages are supported by a micro-brush bearing comprised of silicon columns.

BRIEF DESCRIPTION OF THE DRAWINGS

FIG. 3 shows a cross-section of the micro-friction drive of the invention.

FIG. 4 is a top view of a ring pattern of a rotary encoder scheme used in a preferred embodiment of the invention.

FIGS. 5A and 5B reflect the elements of preferred embodiments of a tilt mirror and scratch drive of the invention.

FIGS. 6A and 6B are detailed views of the elements of an image acquisition chip and transceiver array chip, respectively, of the invention.

FIG. 7 is a cross-section of the micro-brush bearing of the invention.

The invention and its various embodiments can now be better understood by turning to the following detailed description of the preferred embodiments which are presented as illustrated examples of the invention defined in the claims. It is expressly understood that the invention as defined by the claims may be broader than the illustrated embodiments described below.

DETAILED DESCRIPTION OF THE INVENTION

Figure 1A:
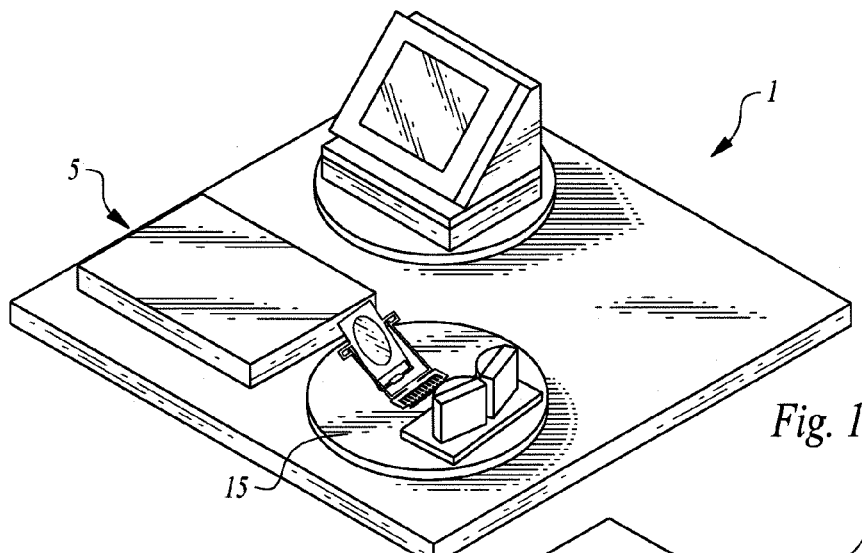
FIGS. 1A and 1B are views of the image acquisition chip and transceiver array chip of the invention.
Figure 1B:
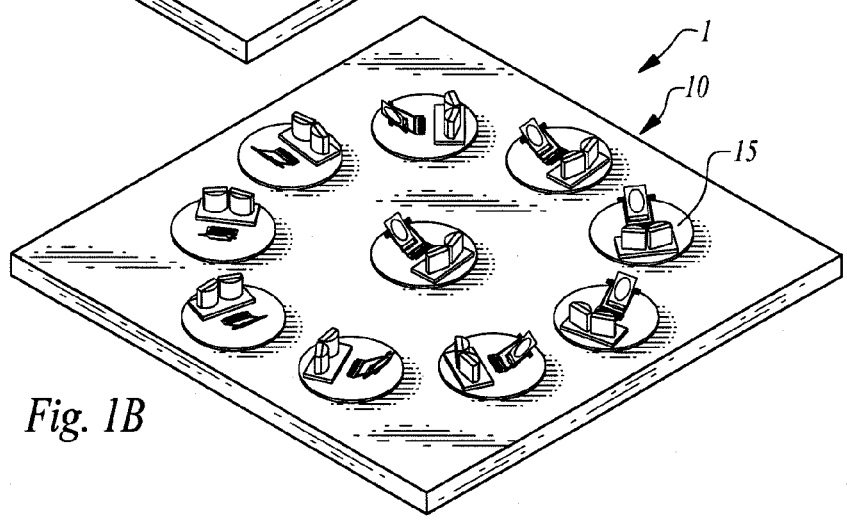

Turning now to the figures wherein like numerals define like elements among the several views, a micro-scale optical surveillance and communication system or micro-image acquisition and transmission system herein 1 is disclosed for the acquisition and transmission video images through air space as reflected in FIGS. 1a and 1b.

FIG. 1 illustrates certain of the general elements of the invention and shows image acquisition chip 5 and transceiver array chip 10. Image acquisition chip 5 functions to gather and transmit optical images. Transceiver array chip 10 serves as the central "hub" that may be optically linked to a group of distributed image acquisition chips 5.

Micro-image acquisition and transmission system 1 may be provided as a network of sensors and data transmitters enabled by at least two of the disclosed innovative MEMS micro-systems wherein one or more image acquisition chips 5 serve as the sensors for gathering and transmitting VGA-quality video images and wherein one or more transceiver array chips 10 serve as data collection and relay "centers" that optically link together a group of sensors.

A preferred embodiment comprises networks of data collection centers with each transceiver array chip 10 linked to a plurality of electronic imaging means or sensors, such as CMOS imagers, for enhanced tactical surveillance capability.

Figure 2:
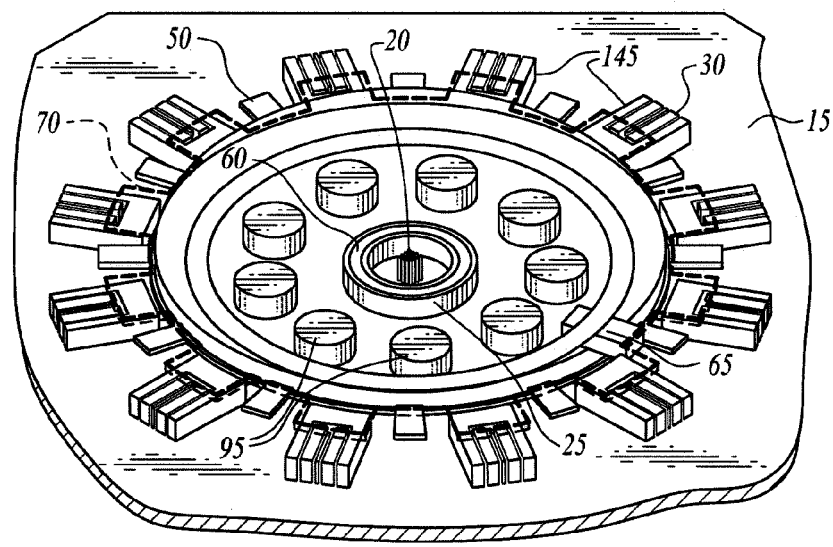
FIG. 2 is an illustration of elements of the micro-powered rotary stage of the invention.
Figure 8A:
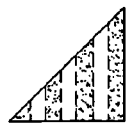
FIGS. 8A-8K illustrate a set of preferred process steps used to assemble an imager to a rotary stage.
Figure 8B:
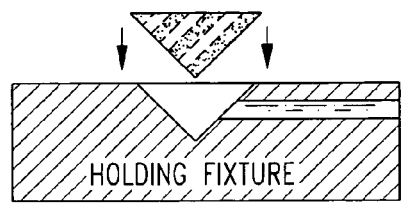
Figure 8C:
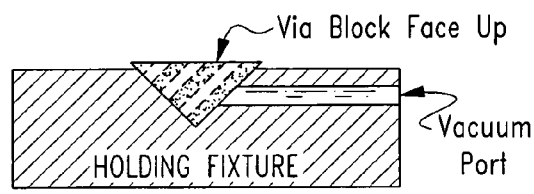
Figure 8D:
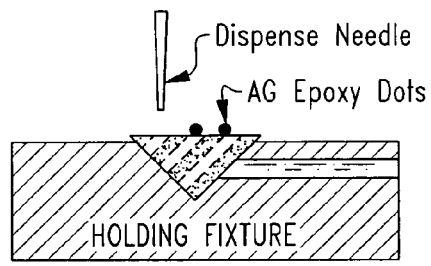
Figure 8E:
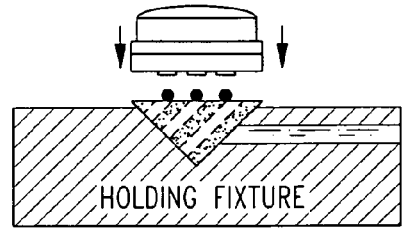
Figure 8F:
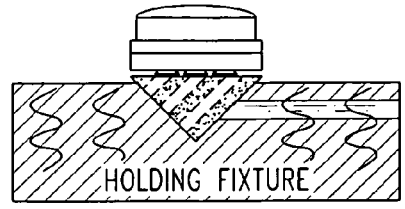
Figure 8G:
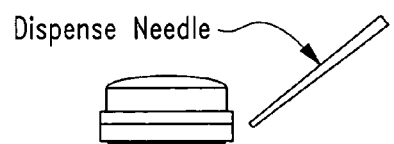
Figure 8H:
Figure 8I:
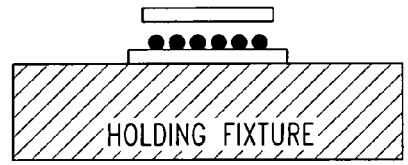
Figure 8J:
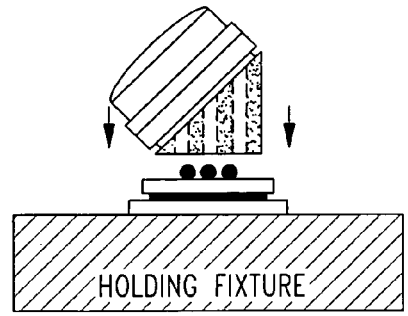
Figure 8K:
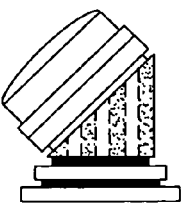

The invention is enabled by several innovations in microsystems technology including a powered rotary platform as illustrated in FIG. 2 and a precision-pointing optical assembly as is further discussed below. These two micro-scale technologies form major elements of the invention and represent advancements in the field of MEMS systems.

The disclosed micro-rotary stage is capable of reliably transferring both power and high-speed data across its rotating stage.

FIGS. 1A, 1B and 2 illustrate elements of the micro-powered rotary stage 15 of the invention. The capabilities of micro-powered rotary stage 15 are accomplished using a micro-brush bearing 20 that uses "silicon-grass", i.e., relatively high aspect ratio (i.e., relatively long), slender rods, pillars or columns of a semiconductor material such as silicon for both supporting the rotating platform and for transferring electrical power as a motor brush. The columns are discussed in later figures and are preferably tapered and cylindrical in cross-section. The relatively stiff silicon columns not only provide strong structural support for the platform but the large number of micro-contact points ensures reliable electrically conductive paths. The micro-powered rotary stage uses capacitive feed through to minimize potential electromagnetic interference for the efficient transfer of high-speed data (in excess of 100 MHz) across the rotating stage.

In addition to transferring power and data, micro-rotary stage 15 allows precise and continuous travel by means of an innovative torque actuator-type of assembly as seen in FIG. 3, herein referred to as micro-friction drive 30. Micro-friction drive 30 of the invention uses a "clamp and move" technique to transfer forces relatively free from sliding friction. A series of actuator blades 35 are actuated by electrostatic forces through electrostatic actuators 40 and are synchronized with electrostatic clamps 45 to move and rotate rotary stage platform 50 that is disposed upon base 55. Micro-friction drive 30 produces forces greater than milli-Newtons desirable for moving a stage loaded with a CMOS imager.

The micro-friction drive provides the actuation force needed to rotate the stage. The micro-friction drive uses a flexible blade to transfer electrostatic force to the edge of the rotary stage. The blade is driven to move reciprocally between two electrodes. A separate electrostatic actuator is synchronized to engage the blade against the rotary stage to transfer the force and produce torque.

As is seen in FIG. 2 and FIG. 3, the periphery of the rotary stage is lined with a series of cantilevers that serve the same function as the "teeth" of a sprocket wheel. In operation, the micro friction drive pulls the cantilever down and pressed it against a blade while electrostatic forces move the blade.

As best seen in FIG. 2, rotary stage platform 50 is supported on a micro-brush bearing 20 that also transfers electrical power onto the stage. High-speed data is transferred by capacitive feed through 25.

Rotary stage platform 50 is further stabilized by active leveling control through electrostatic balancer electrodes 95 disposed underneath rotary stage platform 50. Lastly, by using multiple electrostatic actuators and capacitive sensing, the invention provides a system with low power consumption.

The stage is actuated by multiple micro-friction drives 30 and its position is measured by, for instance, a rotary encoder. Precise rotary stage platform 50 movement is achieved by use differential control of the electrostatic micro-friction drives 30 and by using, for instance, a built-in rotary encoder assembly 60 with a 10-bit Gray Code pattern combined with quadrature signal encoding to achieve an angular rotational resolution of 10 micro-radians, a preferred encoder layout of which is shown in FIG. 4. Rotary encoder assembly 60 is preferably comprised of a rotary encoder reader 65 and rotary encoder 70 and uses capacitive sensing.

The invention addresses multiple factors that affect the control and stability of the optical pointing system of the invention and permits the precise pointing control of the system's optical beam, i.e., pointing accuracy in the azimuth and elevation directions and stability (jitter) of the moving platform.

Turning now to FIGS. 5A and 5B, the precision optical pointing assembly 75 of the invention is achieved by coupling a MEMS "scratch drive" 80 to a hinged tilt mirror 85 that is movably disposed using a mirror hinge 90. High precision control of the mirror's elevation is provided by fine displacement (tens of nanometer capability) of the scratch drive and azimuth is controlled by using the micro-friction drive and rotary encoder described earlier.

With respect to FIGS. 5A and 5B, micro-tilt mirror 85 may be actuated with one or more scratch drives 80, which offer the advantage of fine movement control and the ability to fix a position temporarily with electrostatic force. After the mirror-scratch-drive assembly has been fabricated from deposited and patterned thin-films, the mirror can be erected to an angle close to the final desired tilt by, in a preferred embodiment, hinge assembly 70 may comprise a photoresist hinge used to permit a system to self-assemble by surface tension induced through heating. The amount of tilt on the mirror may then be fine-tuned by selectively activating one, some, or all of the scratch drives.

After the desired angle of tilt is reached, the scratch drives are "locked down" by a DC electrostatic force until the next angular increment is needed. Since the scratch drives are operated electrostatically, they are particularly amenable to miniaturization due to very favorable scaling laws. The design is compact and efficient, occupying as much space as is needed to achieve sufficient electrostatic forces. Also, the same scratch drives serve the due functions of actuation and lock down, and thus further improving compactness.

A micro-rotating mirror for optical coherent medical tomography applications may be incorporated into the invention. In this embodiment, a mirror is erected at 45° on top of a rotating platform driven by an array of polysilicon scratch drives. The platform together with the mirror rotates 360° at speed up to several thousand RPM. The entire assembly may be designed with a 1-mm diameter size constraint, which will allow the entire assembly to fit inside the tip of a catheter for use in biomedical endoscopy.

In this embodiment, a first tomography mirror assembly is pulled into position at 45° while a second tomography mirror assembly flips over itself into place. The benefit of the first tomography mirror is that it can easily be coated with gold during the fabrication process to improve reflectivity. The benefit of the second tomography mirror is that the optically flat bottom surface of the polysilicon layer is used as the reflective surface of the mirror. Photoresist "hinges" are used to allow this system to self-assemble by surface tension induced through heating.

The movement of scratch drives 80 moves mirror hinge 90, hence variably directing a beam angle in the range of 50 milli-degrees in this preferred embodiment. Micro-tilt mirror 85 is desirably fabricated from polysilicon or metal by a surface micromachining process. The use of the disclosed scratch drive 80 enables linear movement as fine as tens of nanometers. Scratch drive 80 may be actuated by electrostatic attraction force between a drive element and an electrode disposed underneath a dielectric film.

With respect to tilt mirror 85, the invention addresses the concern that the mirror actuator must move a relatively large distance with resolutions of sub-microns and that it's processing be compatible with the rotary stage fabrication.

The micro-scale steerable tilt mirror 85 leverages MEMS optical components and utilizes a combination of surface micromachined mirrors with built-in hinges 90 as precision beam steering elements. For the desired large drive travel and fine resolution, MEMS scratch drive 80 is provided requiring low power, having suitable travel, and capable of achieving movement of tens of nanometers. Furthermore, scratch drive 80 can move in both directions by reversing the drive or by control of the drive waveform.

Turning to FIG. 6A showing an image acquisition chip 5, the embodiment may comprise a powered rotary stage 15 with a CMOS imager 100 and a capacitive feed through ASIC 105 and with an active micro optical assembly, comprising a tilt mirror 85, VCSEL transmitter 110 and avalanche photodiode receiver 115. It is expressly noted that any imaging means may be provided and the invention is not limited to a CMOS imager. The VCSEL transmitter and avalanche photodiode receiver comprise a transceiver assembly 120. Control electronics ASIC 122 may be provided on the chip itself.

A preferred embodiment of the invention comprises an image acquisition chip shown in FIG. 6a with two powered rotary stages wherein one rotary stage comprises a CMOS imager 100 with capacitive signal coupling ASIC 105. The second rotary stage comprises a tilt mirror 85 and a VCSEL transceiver 110. A plurality of rotary stages may be integrated on each image acquisition chip and each stage provided with tilt mirror 85 and VCSEL transceiver 110. Using MEMS processes, the size of rotary stages 15 may be less than 10 mm² per stage.

Components of the system are precisely controlled, low power and scalable using MEMS processing. With respect to the rotary stage, transferring power and data across the stage is addressed while the system is capable of generating high actuation forces to overcome the load due to the mass of the active components (imager, VCSEL, photodiode, ASIC, connectors) on the stage.

Transferring power and data across a rotary stage has been a technical challenge in the MEMS community since the beginning of MEMS technology. Unlike conventional machines, MEMS are typically limited to planar processes and those processes do easily fabricate highly three-dimensional components such as roller bearings and electrical slip rings. Another matter of concern is the need to make physical contact to transfer direct current power. A strong electrical contact will necessarily create significant sliding friction; something MEMS does not easily overcome. Although it is possible to use liquid metals for electrical connections, Applicant's prior experience with micro-fluidics suggests effective sealing of liquid in MEMS devices is very difficult.

The disclosed solution for power transfer leverages design practices of electrical motors and precision machine tools. The invention uses a micro-scale semiconductor "motor brush" using a micro-brush bearing 20 comprised of silicon columns to conduct and transfer electrical power across the rotary axle. To overcome friction, conventional practice in precision instrumentation is the use of the smallest possible bearing to make friction forces negligible and to achieve minimum backlash. Applicant has conceived the fabrication of a micro-motor brush using silicon column or "grass" which is generally an undesirable by-product of pin holes in photo-lithography masks, the fabrication of which columns is more fully discussed herein.

Image acquisition chip 5 generally functions as a sensor and data transmitter. Image acquisition chip 5 may comprise any desired imaging sensor means 100, such as a CMOS imager mounted on a rotary stage for acquiring sensor data such as video images across a field of regard of 360 degrees. As can be seen, the imaging data may be transmitted optically to a remote receiver through a micro-optical pointing assembly 75 mounted on a second rotary stage. The VCSEL transmitter 110 laser beam may be directed to any receiver (e.g., a transceiver array chip) located in, for instance, the upper hemisphere by controlling the position of the micro-steerable tilt mirror 85 and its rotary stage.

The signals from imaging sensor means 100 are serialized and converted before forwarding to a VCSEL transmitter 110 for transmission. The electronics for performing data multiplexing and conversion can be performed by an integrated circuit chip or by discrete components off chip.

Imaging sensor means 100 may comprise of a CMOS imager, focusing lens, angled connector and a capacitive data transmitter—these components may all be mounted on the micro-rotary stage. Imaging means 100 may comprise a folded lens.

Power is provided by micro-brush bearing 20 that contacts rotary stage platform 50 on the underside.

All control signals for and data output from imaging means 100 are transferred across the rotary stage on the underside using by a capacitive coupler ASIC 105. To position imaging means 100 at a 45 degree inclination, an angled connector is used to link imaging means 100 to capacitive coupler ASIC 105. The CMOS imager embodiment herein has VGA resolution and is available from a number of sources, including Aptina (formerly Micron Imaging) and ST Micro.

Turning to FIG. 6B, one or more transceiver assemblies 120 comprise a steerable micro-tilt mirror 85, VCSEL 110, and photodiode 115, all mounted on a rotary stage. The micro-tilt mirror assembly 75 can be adjusted to tilt about its base, providing elevation control of the VCSEL laser beam. The azimuth control of the beam is provided by the rotary stage.

The serialized data of the CMOS imager is transmitted by a VCSEL mounted on the stage and optically aligned to the micro-tilt mirror 75. The stage comprises an avalanche photodiode to enable bidirectional data transmission.

A wire routing board 125 is used to connect the imaging sensor means 100, optical transmitter and data conversion chip 122. The wire routing board 125 may be fabricated of either FR4 or silicon with multiple layers of conductive routing.

As illustrated in FIG. 6A, an ASIC may be used for multiplexing the CMOS imager output and converting the serialized data for transmission by the VCSEL. Instead of using an ASIC, the data conversion may also be accomplished off-chip by using discrete components. The entire imaging acquisition chip may be sealed in an optically transparent package to keep out contamination, moisture, and to minimize damage from handling.

The rotary stage of FIG. 2 is supported on a micro-brush bearing 20 made with silicon columns and through-vias. Micro-brush bearing 20 also transfers electrical power to the stage. High-speed data is transferred by a capacitive feedthrough 25. The stage is moved by micro-friction drives using electrostatic actuators as best seen FIG. 3.

Micro-powered rotary stage 15 may generally comprise a silicon platform stage supported about its center on the underside by a micro-brush bearing 20.

Turning to FIG. 7, micro-brush bearing 20 is preferably fabricated as an array of freestanding and electrically conductive, tapered semiconductor, e.g., silicon rods or columns 130 that are cylindrical in cross-section. Silicon columns 130 are preferably fabricated using known DRIE MEMS processes used to define high aspect ratio MEMS structures. Grey scale or half-tone photolithography processes (e.g., dithering) may be used in conjunction with DRIE to define suitable silicon columns 130. Electrical through-vias are used to transfer power from micro-brush bearing 20 onto the top side of the rotary stage.

In this embodiment, the silicon is preferably doped to have low electrical resistivity; hence when terminal portions of the silicon columns make contact to the underside of the stage, electrical power can be transferred from the stationary base to the rotary stage platform. As is seen, below the base, the freestanding silicon columns 30 continue as solid "vias" through the base and are electrically connected to the opposing side of the base.

On the rotary stage, micro-brush bearing 20 makes contact with conductive pads defined on the underside of the stage. These pads are connected to another array of through-vias that transfer electrical current to the top of the stage. Each through-via is supported by filled dielectric material 135 that acts as structural support and electrical isolation. For multi-channel connections, the through-vias can form multiple conducting rings 140 by patterning metal pads on the opposite side of the base and on top of the stage.

The stage is moved and rotated by the micro-friction drive of FIG. 3 that makes contact to, for instance, a set of cantilever "teeth" 145 that are defined on periphery of the stage. Each micro-friction drive is desirably comprises a thin actuator blade 35 sandwiched between two electrostatic actuators 40. By applying a predetermined voltage between the actuators and the blade, the blade can be moved toward either of the two electrodes. The force exerted by the blade is transferred to the stage when the cantilevered teeth are pulled down to make contact with the blades. The downward urging of the cantilevered teeth is achieved by electrostatic actuation. Typically, a balanced pair of blades will engage with the stage to minimize unbalanced forces. To enhance the stability of the stage, an array of electrostatic balancers 95 located underneath the stage act as sensors and actuators to help level the stage.

Turning back to FIG. 4, the rotational position of the stage may be accurately measured by a metal pattern etched on the underside of the stage. In this embodiment, the pattern consists of 10 annuluses; each annulus is divided into 0.35 deg arc segments. The pattern is preferably formed using Binary Reflected Gray Code (BRGC) that is read by a series of capacitive sensors to determine the absolute position of the stage. The 10-bit BRGC provides rotational resolution of about 6.2 milli-radians. To achieve the final resolution of 10 micro-radians, additional signal processing may be used to create additional counts of 620 between every two bits of positional data.

Vertical cavity surface emitting laser (VCSEL) diodes are widely used in optical data transmission because of their high efficiency, beam intensity and relatively low divergence angle. The laser beam output of the VCSEL diodes is collimated using either a micro-lens or a fiber with a gradient index (GRIN) lens. In both cases, the micro-lens and the fiber may desirably be coupled to the VCSEL diode during the manufacturing process. Collimation to within 1 mrad is achievable and has been demonstrated.

The steering accuracy of the tip/tilt mirror and the rotary laser stage is paramount to the operation of the system. Since the VCSEL diode output intensity distribution can vary within the beam, steering of the beam at angles that are a fraction of the beam divergence angle is necessary to maximize the signal to noise ratio. Therefore, the steering system must be capable of steering the beam to within a milli-degree. This steering capability is achievable through the MEMS device described herein.

The mirror size depends to a large extent on the size of the collimated laser beam. In general, the mirror size would be about 500 microns taking into consideration that the mirror redirects both the transmitting beam and the receiving beam. To minimize the effects of aberrations, the mirror surface is ideally flat to within $\frac{1}{20}$th of the laser wavelength.

Cross-talk may occur over relatively short distances where the laser beam divergence may cover more than one detector. Cross-talk may be minimized by assigning a carrier frequency for each of the laser diodes. The signals from multiple diode lasers are then differentiated through the carrier frequency.

The fabrication of the image acquisition chip generally involves first building multiple dissimilar components, e.g., the MEMS micro-rotary stage, signal processing ASIC and the angled connector block. The next step is integrating the different parts with the active photonics components, such as the CMOS imager, VCSEL, and avalanche photodiode.

A preferred assembly sequence for the image acquisition stage is shown in FIGS. 8A-8K comprising:
1. Acquiring a pre-processed 45-degree imager block having through conductive vias.
2. Insertion of the block into a separately provided holding fixture.
3. Apply vacuum.
4. Dispense gold (Ag) epoxy dots to via block face pads.
5. Align imager with attached lens to gold epoxy dots.
6. Apply heat to holding fixture to snap cure gold epoxy.
7. Dispense underfill material, cure and remove from holding figure.
8. Mount rotary stage on holding fixture-dispense gold epoxy dots on pad locations.
9. Align and position ASIC/via chip-cure epoxy, underfill and cure.
10. Dispense gold epoxy dots on pad locations-align and position upper imager assembly-cure gold epoxy, underfill and cure.
11. Completed assembly.

Micro-brush bearing 20 is an element that enables the rotary stage to rotate and conducts electrical signals and power from the base to the stage. FIG. 7 illustrates the concept of the micro-brush bearing 20 of the invention. The key features of the micro-brush bearing 20 are short and stiff silicon columns 130 that are electrically conductive that make solid contact with the mating surface. By using photolithography processes, micro-brush bearing 20 can be made very small to allow multiple conductive regions in the bearing. Another key feature of micro-brush brush bearing 20 is the large number of contacts that ensure redundant electrical paths and low noise generation. Lastly silicon columns 130 can be made with micro-sharp tips to break through any oxide formation and ensure low electrical resistance.

Micro-brush bearing 20 acts as an extension of an array of silicon through-vias as seen in FIG. 7. These silicon vias provide a means for bringing electrical signal through the thickness of the stage thus allowing for electrical connections of the components mounted on the stage.

The friction of micro-brush bearing 20 should be low to minimize the stage actuation forces. A review of literature indicates dynamic friction of coefficient in silicon-to-silicon contact is 0.31 to 0.33 and that by applying surface coating of self-assembled molecules (SAM), the friction range is from 0.177 to 0.3. Another coating used to reduce friction is PFPE overcoat on SAM that can reduce the coefficient of friction to a consistent 0.12.

Although the dynamic friction can be relatively low and be further reduced by use of coating, the dry static friction for silicon-to-silicon has been reported as high as 0.9. It is estimated that the micro-brush bearing generates a frictional torque of about 2 to 8×10-10 Newton-meters. With the small size of the bearing yielding a relatively large mechanical leverage for the micro-friction drive, the estimated available torque is approximately 21×10-10 Newton-meter, or a factor 2.6 higher than the highest expected torque resistance.

Figure 9:
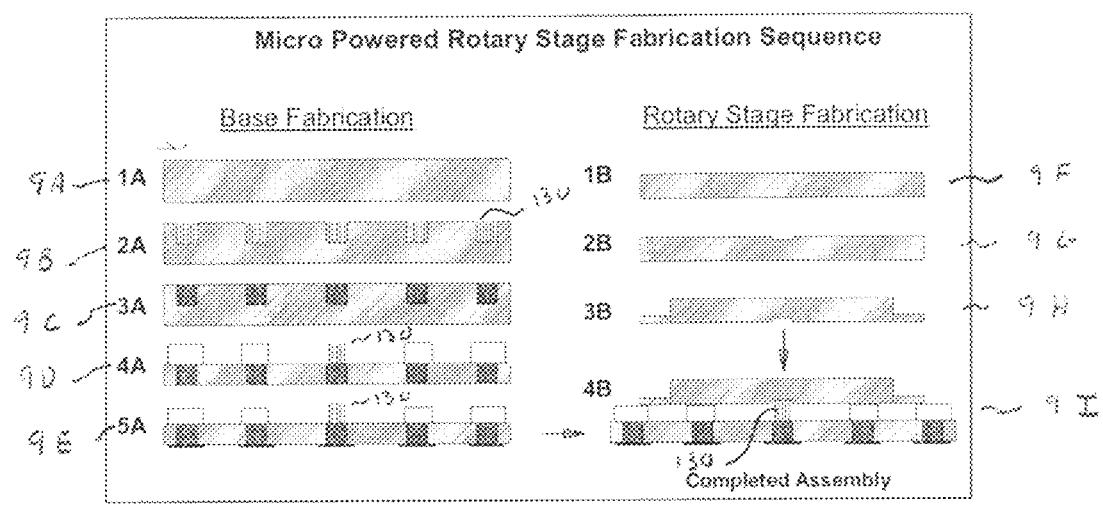
FIGS. 9A-9I describe a set of preferred process steps for fabricating a micro-powered rotary stage of the invention.

A simplified illustration of the rotary stage/micro-brush bearing fabrication process is shown in FIGS. 9A-9I. The base and the stage are fabricated separately and integrated in the final assembly. As shown in the fabrications steps of FIGS. 9A through 9E, the through-vias are first fabricated by deep silicon etching or DRIE, using for instance, halftone or grey scale lithography. After the through-vias are produced (FIG. 9B), the spaces between the vias are filled with a dielectric and conforming material such as silicon nitride (FIG. 9C). The wafer is then flipped over (FIG. 9D) and the backside etched to produce the desired microstructures as well as the silicon columns for the micro-brush bearing. The removal of the field silicon leaves the through vias electrically isolated. Finally, an electrically conductive film is deposited and patterned to produce the desired conductive pads (FIG. 9E).

Separately the stage is fabricated as shown in FIGS. 9F to 9H, and finally aligned and integrated with the base as shown in FIG. 9I. For ease of illustration, the through-vias are not shown in the fabrication of the stage.

The periphery of the rotary stage is lined with a series of teeth 145. The cantilever teeth are connected to a flexure to allow the cantilever to bend easily and to allow it to freely follow the arched path of the bending blade. The actuator blade and the electrodes are designed to ensure no electrical shorts by use of mechanical stops or surface dielectric coating. The rotary stage and the blade are maintained at virtual ground so as to prevent any attractive force between the two elements.

An estimate of the torque that can be generated by three pairs of micro-friction drives is 21×10-10N-m using actuation voltage of 40 Volts.

Figure 10:
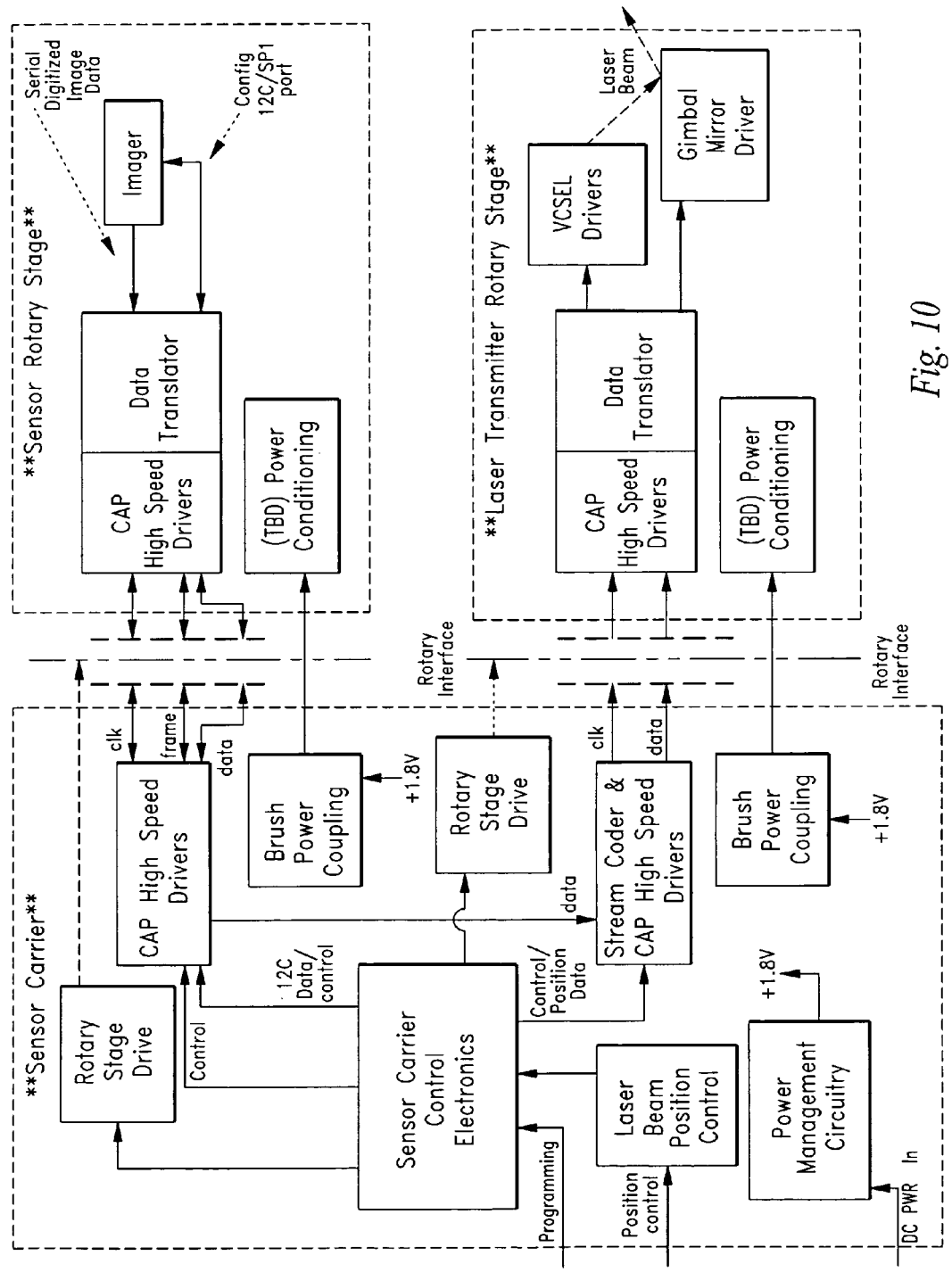
FIG. 10 is a block diagram of the sensor/laser transmitter module of the invention.

FIG. 10 illustrates a block diagram of the major functional blocks in a preferred embodiment of the control electronics of the invention.

Figure 11:
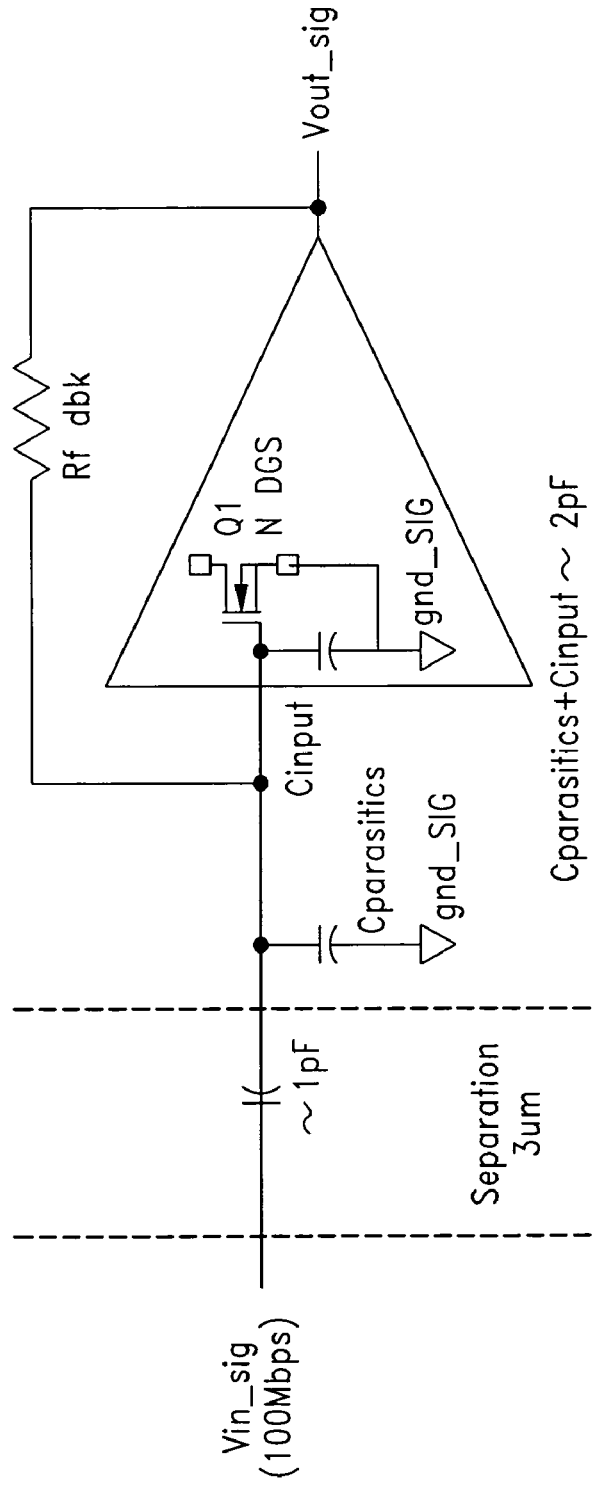
FIG. 11 is a model of capacitive data transfer.

A preliminary model of the capacitive data transfer is shown in FIG. 11.

With respect to FIG. 10 three inputs are shown into the Sensor Carrier module: 1) positioning input, 2) DC power, and 3) programming for the electronic controller.

The main functional blocks of the Sensory Rotary Stage consist of a VGA color imager, necessary power conditioning and circuitry to configure and transmit the high-speed serial video data over the capacitive rotary stage link. The bi-directional capacitive data link either uplinks to configure the imager (boot-up only) or downlinks a stream of image serial digital data to the Laser Transmitter Rotary-Stage.

The Data Translator performs two functions. It controls: 1) the bi-directional capacitive rotary data interface, either uploading imager configuration or downloads image video data, and 2) performs any required control imager housekeeping.

For a reliable imager data stage link, it is desirable to have three signals from the imager; one for pixel data, the other for frame sync and one clock.

Thus, the Data Translator may be used to control upload imager configuration from the Sensor Carrier side and to control image data download.

The Data Translator will mainly be a high speed multiplexer to route the throughput data. During boot-up the Sensor Carrier side is deemed the "Master". The Sensor Rotary Stage is setup to receive the I2C image configuration information from the Electronic Carrier Control Electronics. It remains in this transfer mode until after image configuration is completed and no signal is received from the Sensor Carrier Control Electronics for more than one second. After a small delay to assure all drivers are tri-stated the stage interface enters the video downlink data transfer mode. The Sensor Carrier side would likewise enter the imager downlink video data mode in a similar manner.

Some power conditioning may be desirable to minimize the noise created from the Brush Power Coupling scheme.

The above-described circuitry requires the Data Translator to implement a simple timer/counter and appropriate digital switchers.

Carrier electronics perform the following functions:
1. Controls the capacitor high-speed bi-directional interface (control & drivers) for both of the modules.
2. Controls the data download interface (both boot-up uplink imager configuration and download video data from the Sensor Rotary Stage).
3. Control the data uplink to the stage. This includes an inline Stream Coder which adds the frame sync and clocking info into the laser transmitted stream.
4. Controls azimuth pointing direction/rotary stage drivers for both stages
5. Controls elevation pointing direction interface for the stage.
6. Converts input power to circuitry power (+1.8V).
7. Receives the input stage position control (likely from an external joystick input) and sets the laser beam position in both azimuth and elevation onto the correct detector on the Photo detector Receiver Array.
8. Allows external programming of the Sensor Carrier Control Electronics for updating imager configuration memory.

The Laser Transmitter Rotary Stage performs the following functions:
1. Receives elevation position information from the Sensor Carrier and drives either the Gimbal Mirror vertically or the VSEL imager lased video output.

Some power conditioning may be required to minimize the noise created from the Brush Power Coupling scheme.

The Data Translator controls:
1. The unidirectional capacitive rotary data interface.
2. Uploads elevation Gimbaled Mirror Laser position information.
3. Uploads serialized video data to the VCSEL diode drivers.

Figure 12:
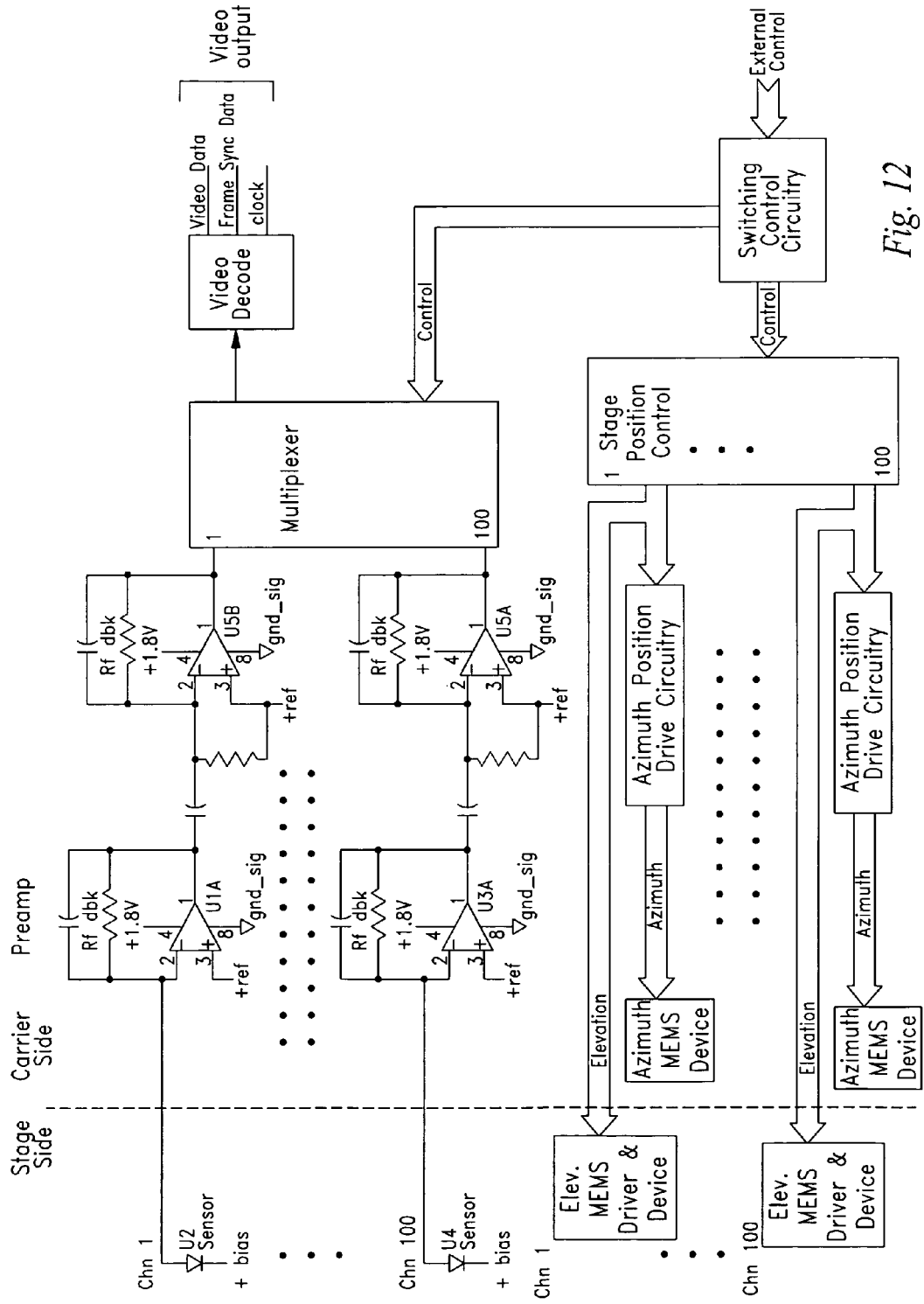
FIG. 12 is a block diagram showing components of a receiver array.

During boot-up the TRS Data Translator enters the Gimbal Mirror elevation control mode. It remains in this mode until a no signal has been received from the Sensor Carrier Control Electronics for more than one second which terminates the mode. A Data Translator time-out will switch the data output from the Gimbal Mirror driver to the VCSEL driver. The Sensor Carrier side will likewise switch to the video VCSEL driving mode. To accomplish this, the ASIC desirably has the following functions:

1. Implement a mixed signal ASCI design.
2. Bi-directional capacitive driver capability.
3. Digital signal output multiplexing (also bi-directional)
4. A simple one-second time.
5. A 'Master'/' Slave' and 'Slave'/'Master' capability.
6. I2C firmware compatibility (not necessarily hardware compatibility).
7. An output, which can either be a serial, stream or latched as a 16-bit output word Turning now to FIG. 12, a block diagram of the control electronics for the Transceiver Array Chip is shown. The input light transmitted by each Sensor Carrier (Laser Transmitter Rotary Stage) is collected by a dedicated high-speed photodiode (e.g. Hamamatsu S9717) operating in the photoconductive mode. The rotary stage has an azimuth control, external to the MEMS stage, and an elevation control which is located on the Receiver Array Carrier itself.

The Stage Position Control block receives control information external to Receiver Array, converts the signal to both elevation and azimuth drive format and send this to the appropriate stage drive circuitry. The MEMS rotary state of the Receiver Array is positioned to receive only its pre-selected dedicated light signal.

The first laser amplifier stage is a high-speed current amplifier, which inverts the signal seen at its output. The amplifier reference input is offset so that only one PS is required for operation. The second stage (if required) will perform any additional signal conditioning or add additional gain.

The plurality of laser signals is multiplexed under the Switch Control Circuitry (control external to the Receiver Array). This signal is the digitized image output signal sent by each image module. This signal is a digitized video string with clock, video data, and frame sync information embedded. The Video Decoder block removes the serialized embedded data and yields three image signals (video data, frame sync, and clock).

To achieve a desired positional accuracy, it is possible to use two approaches. First, the stage may be patterned on the underside with a Binary Reflected Gray Code (BRGC) with 1024 segments over the full circle. The pattern can be ready by a capacitive sensor array consisting of 10 linear sensors. Each segment may be approximately 50 microns×50 microns. Estimates of the capacitance shows that the changes between zero and full capacitance is well within the sensitivity of a standard capacitive readout circuit produced by Irvine Sensors Corp, assignee herein (4 aF/rtHz). The BRGC yields an absolute position accuracy of 6.13 milli-radians.

To achieve 10 micro-radians, a single segment must further be divided by another 620 counts. Hence, a second encoding scheme will be used to produce two square waves that re 90 degrees out of phase (quadratures) from a simple capacitive pattern. The leading edges of the square wave will be used to generate another sinusoidal wave, and by digitizing the signal into, say 10 bits resolution, the angular position between the triggering edges can be resolved to better than 10 micro-radians. FIG. 4 illustrates a standard BRGC pattern for 4 bits. Note that the change from each successive rotation is always only one bit—a feature that makes BRGC a robust coding system.

The micro-mirror assembly and the entire scratch drive array are fabricated from the same surface micromachined gold layer. The hinges on the mirror and the joints connecting the mirror frame to the scratch drive array are made from photoresist surface tension driven self-assembly. The volume of the photoresist, the surface area of the hinges covered by the photoresist, as well as the heating temperature and duration are design parameters that determine the approximate amount of bend in the hinge after the self-assembly process. The mirror frame and the scratch drive array are brought to an angle close to the center of the range of tilt in the final design. The flexible hinges allow fine movements during dynamic operation.

A process based on and modified using photoresist surface tension assembly offers the advantage of controllable self-assembly in erecting the mirror to within the range of tilt motions without the need for excessive heating in contrast to the approaches that rely on melting solder metals. It requires only two masking steps, one to define the sacrificial pattern and the other the mechanical layer. Gold may be used as the mechanical layer which serves as the mirror, the frame, the connecting arms, and the scratch drive array. The use of gold as the mirror surface provides the best reflectivity.

This approach also possesses a low stiffness compared to polysilicon and thus requires less electrostatic force to operate as scratch drive. Also, as the connecting arms and hinges, the softness permits easier tilts and, as a result, lowers the operating voltage. A meandering frame may be provided to eliminate the mechanical influence on the mirror surface flatness while the assembly is going through dynamic operations.

Thick photoresist (Hoechst AZ4562) maybe used for the hinge material. The thickness is chosen may be 10 μm. The width of the pad covered by the photoresist hinge should be between 15 to 20 μm to achieve roughly 45° bend. The exact pad width may not be critical, since the heating temperature and duration can be adjusted to compensate. After the self-assembly process, the hinges are fixed at the resulting angle. The frames and the final 3-D structure should be designed such that the different natural frequencies within the structure are separated from the operating frequencies to avoid exciting undesired mirror vibrations.

The gold scratch drive array is designed to allow individual access to each of the scratch drive elements. The opposing scratch drive electrodes are strips of conductors buried under a thin layer of dielectric and aligned along the direction of the scratch drive movement. Each scratch drive element is directly on top of one conductor strip separated by the thin dielectric layer, thereby can be operated independently from other scratch drive elements by selectively activating the conductor strips. The advantages of gold scratch drives over polysilicon are they substantially lower stiffness and allowing lower operation voltages, resistance against oxidization and thus do not result in accumulation of charges over time (a common problem with polysilicon scratch drives), easily deposited and patterned by lift-off techniques, and, most importantly, exhibit less stiction, i.e., static friction, that is detrimental to the operation of a scratch drive.

Scratch drive operation is based on tuning the drive frequency and amplitude, as well as waveform to achieve controls in actuation, amplitude, speed and direction. It is possible to allow scratch drive motion as small as 10 nm increments repeatedly. By selectively actuating one, some, or all of the scratch drives, the achievable control in drive motion and speed can be further increased. Another benefit of individually addressable scratch elements is to safeguard against actuator deterioration or failure by allowing the ability to bypass failed drive elements that would otherwise interfere with the overall operation of the assembly.

The silicon columns must be stiff enough to provide sufficient structural support but also slender enough to yield a small brush bearing. The friction and wear between the brush bearing elements and the conductive surface must be kept to a minimum to avoid exceeding the torque capability of the micro-friction drive. Although friction-reducing coatings such as SAM and PFPE are available, the resulting film must not reduce the electrical conductivity of the contacts.

The clamp down forces should be reacted by the brush bearing while allowing the cantilever teeth to engage fully with the electrostatic actuator. The friction drive should have a maximum speed due to the stiffness of the cantilever teeth.

Many alterations and modifications may be made by those having ordinary skill in the art without departing from the spirit and scope of the invention. Therefore, it must be understood that the illustrated embodiment has been set forth only for the purposes of example and that it should not be taken as limiting the invention as defined by the following claims. For example, notwithstanding the fact that the elements of a claim are set forth below in a certain combination, it must be expressly understood that the invention includes other combinations of fewer, more or different elements, which are disclosed in above even when not initially claimed in such combinations.

The words used in this specification to describe the invention and its various embodiments are to be understood not only in the sense of their commonly defined meanings, but to include by special definition in this specification structure, material or acts beyond the scope of the commonly defined meanings. Thus if an element can be understood in the context of this specification as including more than one meaning, then its use in a claim must be understood as being generic to all possible meanings supported by the specification and by the word itself.

The definitions of the words or elements of the following claims are, therefore, defined in this specification to include not only the combination of elements which are literally set forth, but all equivalent structure, material or acts for performing substantially the same function in substantially the same way to obtain substantially the same result. In this sense it is therefore contemplated that an equivalent substitution of two or more elements may be made for any one of the elements in the claims below or that a single element may be substituted for two or more elements in a claim. Although elements may be described above as acting in certain combinations and even initially claimed as such, it is to be expressly understood that one or more elements from a claimed combination can in some cases be excised from the combination and that the claimed combination may be directed to a subcombination or variation of a subcombination.

Insubstantial changes from the claimed subject matter as viewed by a person with ordinary skill in the art, now known or later devised, are expressly contemplated as being equivalently within the scope of the claims. Therefore, obvious substitutions now or later known to one with ordinary skill in the art are defined to be within the scope of the defined elements.

The claims are thus to be understood to include what is specifically illustrated and described above, what is conceptually equivalent, what can be obviously substituted and also what essentially incorporates the essential idea of the invention.

I claim:

1. A micro-brush bearing comprising a plurality of electrically conductive columns comprising a semiconductor material, each of the conductive columns having a terminal end, the columns configured to transfer electrical power to a plurality of contact pads on a stage rotatably supported by the columns.

2. The micro-brush bearing of claim 1 wherein the electrically conductive columns are comprised of silicon.

3. The micro-brush bearing of claim 1 wherein the electrically conductive columns are substantially circular in cross-section along their length.

4. The micro-brush bearing of claim 1 wherein the electrically conductive columns are tapered along their length.

5. A micro-powered rotary stage system comprising: a micro-brush bearing comprising a plurality of electrically conductive columns comprising a semiconductor material, each of the conductive columns having a terminal end, the columns configured to transfer electrical power to a plurality of contact pads on a stage rotatably supported by the columns, a pair of electrostatic actuators, an actuator blade, and, at least one capacitive feed-through.

6. The micro-powered rotary stage of claim 5 further comprising a Binary Reflected Gray Code pattern configured to be read by a series of capacitive sensors.

7. The micro-powered rotary stage of claim 5 wherein the electrically conductive columns are comprised of silicon.

8. The micro-powered rotary stage of claim 5 wherein the electrically conductive columns are substantially circular in cross-section along their length.

9. The micro-powered rotary stage of claim 5 wherein the electrically conductive columns are tapered along their length.

* * * * *